United States Patent
Simon et al.

(10) Patent No.: US 10,005,913 B2
(45) Date of Patent: *Jun. 26, 2018

(54) FIRE-PROTECTION COMPOSITION AND USE THEREOF

(71) Applicant: HILTI AKTIENGESELLSCHAFT, Schaan (LI)

(72) Inventors: Sebastian Simon, Buchloe Lindenberg (DE); Frank Thiemann, Landsberg/Lech (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 34 days.

This patent is subject to a terminal disclaimer.

(21) Appl. No.: 15/321,242

(22) PCT Filed: Jun. 25, 2015

(86) PCT No.: PCT/EP2015/064330
§ 371 (c)(1),
(2) Date: Dec. 22, 2016

(87) PCT Pub. No.: WO2015/197740
PCT Pub. Date: Dec. 30, 2015

(65) Prior Publication Data
US 2017/0210914 A1    Jul. 27, 2017

(30) Foreign Application Priority Data
Jun. 25, 2014   (EP) .................................... 14173807

(51) Int. Cl.
| | | |
|---|---|---|
| *C09D 5/18* | (2006.01) | |
| *C09D 4/00* | (2006.01) | |
| *C09D 7/12* | (2006.01) | |
| *C09K 21/02* | (2006.01) | |
| *C09D 7/61* | (2018.01) | |
| *C08K 3/26* | (2006.01) | |
| *C08K 3/22* | (2006.01) | |

(52) U.S. Cl.
CPC ................ *C09D 5/18* (2013.01); *C09D 4/00* (2013.01); *C09D 7/1216* (2013.01); *C09D 7/61* (2018.01); *C09K 21/02* (2013.01); *C08K 3/22* (2013.01); *C08K 3/26* (2013.01); *C08K 2003/2227* (2013.01); *C08K 2003/262* (2013.01); *C08K 2003/265* (2013.01); *C08K 2201/014* (2013.01)

(58) Field of Classification Search
CPC .......... C09D 5/18; C09D 4/00; C09D 7/1216; C09K 21/02; C09K 7/61; C08K 3/22; C08K 3/26; C08K 2003/262; C08K 2003/265; C08K 2003/2227; C08K 2201/014

See application file for complete search history.

(56) References Cited

U.S. PATENT DOCUMENTS

| | | | |
|---|---|---|---|
| 3,875,109 A | 4/1975 | Bridgland et al. | |
| 7,396,429 B2* | 7/2008 | Beckley ................. | C08G 61/12 156/275.7 |
| 7,473,734 B2* | 1/2009 | Beckley ............ | C08F 222/1006 525/419 |
| 8,013,068 B2* | 9/2011 | Beckley ............... | C09D 175/16 525/185 |
| 9,796,859 B2* | 10/2017 | Simon .................... | C09D 5/185 |
| 2015/0337160 A1* | 11/2015 | Brinkhorst ........... | C09D 133/14 524/720 |
| 2016/0068689 A1* | 3/2016 | Lang ........................ | C08K 3/22 523/179 |
| 2016/0096142 A1* | 4/2016 | Harris .................. | B01D 63/023 210/496 |
| 2016/0204584 A1* | 7/2016 | Knight ................... | C08G 61/12 29/869 |
| 2017/0130066 A1* | 5/2017 | Lang ........................ | C09D 5/18 |
| 2017/0204276 A1* | 7/2017 | Brinkhorst ............... | C09D 5/18 |

FOREIGN PATENT DOCUMENTS

| | | |
|---|---|---|
| DE | 2343627 A1 | 4/1974 |
| DE | 19649749 A1 | 6/1998 |

OTHER PUBLICATIONS

International Search Report dated Sep. 10, 2015 in PCT/EP2015/064330 filed Jun. 25, 2015.

* cited by examiner

*Primary Examiner* — Anthony J Green
(74) *Attorney, Agent, or Firm* — Grüneberg and Myers PLLC

(57) ABSTRACT

A composition is described, which contains a binder on the basis of a compound having low-electron multiple carbon bonds and a carbanion-forming compound. By means of the composition according to the invention, the expansion rate of which is relatively high, coatings having the layer thickness required for the respective fire-resistance duration can be applied in simple and fast manner, wherein the layer thickness can be reduced to a minimum and nevertheless, a good fire-protection effect can be achieved. The composition according to the invention is particularly suitable for fire protection, particularly as a coating for cables and cable runs, to increase their fire-resistance period.

23 Claims, No Drawings

FIRE-PROTECTION COMPOSITION AND USE THEREOF

The present invention relates to a composition, particularly a composition having an ablative effect, which contains a binder on the basis of a compound having low-electron multiple carbon bonds and a compound forming carbanions, as well as its use for fire protection, particularly for coating components such as supports, beams, frame members, insulation systems, for example soft fittings, cables, cable bundles to increase the fire-resistance duration.

In fires, cable runs form special danger sites for several reasons. For one thing, in fires, intensive smoke development occurs from cables insulated with plastic, with the emission of harmful, substances, some of them toxic. For another thing, a fire can spread quickly along cable runs, and under some circumstances, can be passed along to a location far removed from the original source of the fire. In cable systems, the problem further exists that in these cables, the effect of the insulation decreases due to thermal action or burning off, and an interruption of the electricity flow can occur due to a short-circuit, and thereby the cables are destroyed or become unable to function.

Electrical cables and lines are frequently laid in hallways and divided into the adjacent rooms from there. These hallways serve as flight paths and rescue paths in the event of a fire, which become unusable when a fire of cable installation occurs, due to smoke development and toxic fire gases, with burning PVC, for example, releasing severely corrosive gases. Cable concentrations therefore represent a significant hazard potential, particularly in industrial construction, in power plant systems, in hospitals, large buildings and administrative buildings, and, in general, in buildings having great installation density. In these buildings, cable insulations are often the decisive fire load and cause long-lasting fires with temperatures up to more than 1000° C., in the most disadvantageous cases. For the reasons stated, particular attention must be paid to cable runs, with regard to fire-protection measures.

In order to prevent these hazards of a lack of ability of the cables to function and of the great increase in fire load caused by the cables, at least for a restricted period of time, it is known to spatially separate the cables by non-combustible construction materials of construction material class A1 or A2, in that the cables are laid in installation maintenance ducts and/or function maintenance ducts, for example. However, this requires great work effort. In addition, a great requirement for space occurs, due to complicated designs that must take into consideration the weight of the installation maintenance ducts and/or function maintenance ducts in addition to the weight of the cable run. For this purpose, cables and cable runs are frequently wrapped with insulation materials such as aluminum oxide silica mats or mineral wool mats. In order to achieve sufficient fire protection, the material must be very thick. However, this leads to problems with regard to the distances between the protected object and adjacent or superimposed objects. Furthermore, these materials cause problems during normal operation because of their thermal insulation properties. One of these problems is referred to as "reduction in current carrying capacity." This means that that the heat generated by electrical cables in the cable pipe or the cable run can no longer be conducted away in the region of the insulation, and this leads to the result that the reliable current operating level permissible in these cables is reduced or that overheating of the cables takes place. These disadvantages make this type of fire protection very inflexible with regard to its area of use.

To prevent these disadvantages, it is also known to apply coatings for protection of electrical cables, which coatings intumesce, i.e. foam up in the event of a fire, under thermal action, and thereby form an insulation layer or absorb heat by means of physical and chemical processes and thereby have a cooling effect.

It is possible, using coatings that form insulation layers, to prevent the involvement of cables in fire events for 30 minutes or longer. Such coated cables are often laid in cable runs. In this connection, however, it has been shown that in the case of vertical or inclined placement of the cable runs, even a completely foamed-up insulation-layer-forming agent cannot prevent fire from spreading without additional measures. As they heat up, the cables deform so greatly between the cable clamps that the coating forming the insulation layer tears open and splits off, in part. Foam that is formed also comes loose from the cables and falls off. If the coating is applied after the cables are laid, the cables are not accessible to their full extent in the region of the clamp constructions. This has the result that in the case of a vertical or inclined placement of the cable runs, only a foam having slight thickness is formed in the event of the fire, in the region of the clamp construction, which foam is no longer sufficient as fire protection for 30 minutes. When laying PVC cables, the problems known in the event of a fire therefore occur once again.

It is also known to use halogen-free cables that are treated to be flame-resistant or to have low flammability, which cables are flame-retardant and cause little smoke, and possess only a low capacity for spreading fire. However, these cables are very expensive and are therefore used only under conditions of extreme risk.

To avoid the disadvantages of coatings that form insulation layers, materials were applied to the cables and cable holders, in cable runs, which materials demonstrate an ablation effect, i.e. have a cooling effect under the effect of heat, and form a ceramic, as described, for example, in DE 196 49 749 A1. In this document, a method for forming fire protection for flammable or heat-endangered components is described, wherein the components are provided with a coating that contains an inorganic material composed of finely ground hydraulic binders such as calcium silicate, calcium aluminate or calcium ferrite as a binder, to which ablative substances such as aluminum hydroxide or magnesium hydroxide are added. It is a disadvantage of this measure that on the one hand, application of the material that demonstrates the ablation effect is time-intensive, and, on the other hand, adhesion of the material to the cables and the cable holders represents a problem.

Other coating systems currently on the market, which do not demonstrate some of the disadvantages mentioned above, are single-component coating compositions on the basis of polymer dispersions, which contain compounds that decompose endothermically. A disadvantage of these coatings is, for one thing, the relatively long drying period of the coating and the accompanying low dry layer thickness, since these systems dry physically, i.e. by means of evaporation of the solvent. Therefore multiple applications, one following after the other, are required for thicker coatings, and this also makes these systems time-intensive and labor-intensive and therefore uneconomical.

The invention is therefore based on the task of creating a coating system having an ablative effect, of the type stated initially, which system avoids the disadvantages mentioned, is particularly not solvent-based or water-based, and demonstrates fast hardening, is easy to apply on the basis of correspondingly coordinated viscosity, and requires only a slight layer thickness on the basis of the high degree of filling that can be achieved.

It is furthermore a disadvantage of the known systems that the reactivity of the binder components determines the processing time of the compositions. Furthermore, additional demands are made on coating systems, such as the influence of time on hardening (hardening profile), but without negatively influencing hardening itself, i.e. the reactivity of the binder components, or influencing the surface of the hardened coating, which cannot be achieved with the known composition. However, these demands counter one another in a certain way. For rapid hardening, but also in order to achieve robustness with regard to acidic contaminants, reactive binder components and/or high concentrations of catalysts are necessary. However, high concentrations of catalysts can negatively influence the surface composition and the hardness of the coating. From WO 2013/050623 A1, a Michael addition system is known, which contains not only a Michael donor and a Michael acceptor, but also a further Michael donor, the reactivity of which differs from that of the actual Michael donor, as an inhibitor for setting the reactivity profile of the Michael addition system.

However, this system does not have any fire-protection properties, so that it cannot be used as a fire-protection coating.

It is therefore a further task of the invention to create a coating that has an ablative effect, of the type mentioned initially, the reactivity of which coating is adjustable, so that an open time can be set and the coating system can be adapted to different processing conditions.

This task is accomplished by the composition according to claim 1. Preferred embodiments can be derived from the dependent claims.

Accordingly, an object of the invention is a composition having an ablative effect, comprising a Constituent A, which contains a multi-functional Michael acceptor that has at least two low-electron multiple carbon bonds per molecules as functional Michael acceptor groups;

a Constituent B, which contains a multi-functional Michael donor, which has at least two C,H-acidic groups per molecule as functional Michael donor groups;

a Constituent C that contains a compound that has a X—H group, wherein this compound can react with Constituent A, and wherein X stands for N, P, O, S or C, with the proviso that if X stands for C, C is part of an acidic methyl group;

a Constituent D, which contains a catalyst for the Michael addition reaction; and a Constituent E, which contains a fire-protection additive that has an ablative effect.

By means of the composition according to the invention, coatings having the layer thickness required for the respective fire-resistance duration can be applied in simple and fast manner, wherein the processing time can be set in simple manner. The advantages achieved by the invention can essentially be seen in that in comparison with the systems on a solvent basis or water basis, with their inherently slow hardening times, the working time can be significantly reduced. Because of the low viscosity of the composition in the application sector, set by way of suitable thickener systems, application without heating the composition, for example by means of the widespread airless spraying method, is possible, in contrast to epoxy amine systems.

A further advantage lies in that it is possible, to a great extent or entirely, to do without health-endangering substances or substances that must be identified, such as critical amine compounds, for example.

A further advantage lies in that the composition according to the invention can have a high degree of filling with the fire-protection additives, so that a great insulation effect is achieved even with thin layers. The possible high degree of filling of the composition can be achieved even without the use of volatile solvents. Accordingly, the material expenditure decreases, and this has an advantageous effect on material costs, particularly when the composition is applied over large areas. This is particularly achieved by using a reactive system that does not dry physically, but rather hardens chemically, by way of an addition reaction. Therefore the compositions do not suffer any volume loss due to drying of solvents or, in the case of water-based systems, of water. Thus, in a traditional system, a solvent content of about 25% is typical. This means that of a 10 mm wet film layer, only 7.5 mm remain on the substrate to be protected as the actual protective layer. In the case of the composition according to the invention, more than 95% of the coating remains on the substrate to be protected.

In the event of a fire, the binder softens, and the fire-protection additives contained in it decompose, as a function of the additives used, in an endothermic physical or chemical reaction, with the formation of water and inert gases, leading to cooling of the cables, for one thing, and, for another thing, to dilution of the flammable gases or, by means of the formation of a protective layer that protects the substrate from attack by heat and oxygen, and, for another thing, prevents the spread of fire, by means of the coating burning off.

The compositions according to the invention demonstrate excellent adhesion to different substrates as compared with solvent-based or water-based systems, if these are applied without a primer, so that they can be used universally and adhere not only to the lines to be protected but also to other carrier materials.

For a better understanding of the invention, the following explanations of the terminology used herein are considered to be practical. In the sense of the invention:

a "Michael addition" is, in general, a reaction between a Michael donor and a Michael acceptor, frequently in the presence of a catalyst, such as, for example, a strong base; Michael addition is sufficiently known and frequently described in the literature;

a "Michael acceptor" is a compound having at least one C—C double bond or C—C triple bond, which is not aromatic and low in electrons; the Michael acceptor is composed of the functional Michael acceptor group and a framework;

a "functional Michael acceptor group" is the group in the Michael acceptor that comprises a functional group, more precisely an electron-withdrawing group, and, in an α position to this, the C—C double bond or C—C triple bond to which the Michael donor is added; the low-electron C—C double bond or C—C triple bond is also referred to as a Michael-active multiple carbon bond; the functional Michael acceptor group is bound to the framework or tied into it; a Michael acceptor can have one or more separate functional Michael acceptor groups; each functional Michael acceptor group can have a Michael-active multiple carbon bond; the total number of Michael-active multiple carbon bonds in the molecule corresponds to the functionality of the Michael acceptor;

a "multi-functional Michael acceptor" is a compound that has two or more functional Michael acceptor groups or Michael-active multiple carbon bonds;

"low in electrons" means that the multiple carbon bond carries electron-withdrawing groups in the immediate vicinity, i.e. generally on the carbon atom adjacent to the multiple bond, which groups draw off the electron density from the multiple bond, such as C=O, for example;

a "Michael donor" is a C,H-acidic compound, i.e. a compound having at least one acidic C,H-bond, which can form at least one carbanion that is able to add to the Michael acceptor; the acidic hydrogen atom is also referred to as a Michael-active hydrogen atom; the Michael donor is composed of the functional Michael donor group and a framework;

a "functional Michael donor group" is the group in the Michael donor that comprises a functional group and, in a position to it, the carbon atom from which the carbanion is formed; the functional Michael donor group is bound to the framework; a Michael donor can have one or more separate functional Michael donor groups; each functional Michael donor group can have a Michael-active hydrogen atom; the total number of Michael-active hydrogen atoms on the molecule corresponds to the functionality of the Michael donor;

a "multi-functional Michael donor" is a compound that has two or more functional Michael donor groups or Michael-active hydrogen atoms;

the "framework" is part of the donor molecule or acceptor molecule, to which the functional Michael donor group or the functional Michael acceptor group is bound;

"having an ablative effect" means that when elevated temperatures, i.e. above 200° C., as they can occur in the event of a fire, for example, are in effect, a number of chemical and physical reactions take place, which require energy in the form of heat, wherein this energy is withdrawn from the surroundings; this term is used as an equivalent of the term "endothermically decomposing";

"(meth)acryl . . . / . . . (meth)acryl . . ." means that both the "methacryl . . . / . . . methacryl . . ." and the "acryl . . . / . . . acryl . . ." compounds are supposed to be comprised;

an "oligomer" is a molecule having 2 to 5 repetition units, and a "polymer" is a molecule having 6 or more repetition units, and they can have structures that are linear, branched, star-shaped, twisted, hyper-branched or cross-linked; in general, polymers can have a single type of repetition unit ("homopolymers") or they can have more than one type of repetition units ("copolymers"). As used herein, "resin" is a synonym for polymer.

In general, it is assumed that the reaction of a Michael donor having a functionality of two with a Michael acceptor having a functionality of two will lead to linear molecular structures. Often, molecular structures must be produced that are branched and/or cross-linked, and the use of at least one ingredient having a functionality greater than two is required for this. For this reason, the multi-functional Michael donor or the multi-functional Michael acceptor or both preferably have a functionality greater than two.

It is practical if a compound having at least two low-electron multiple carbon bonds, such as C—C double bonds or C—C triple bonds, preferably C—C double bonds, per molecule is used as the Michael acceptor, as the functional Michael acceptor group.

According to an embodiment of the invention, the Michael acceptor is a compound having at least one functional Michael acceptor group having the structure (I) or (II):

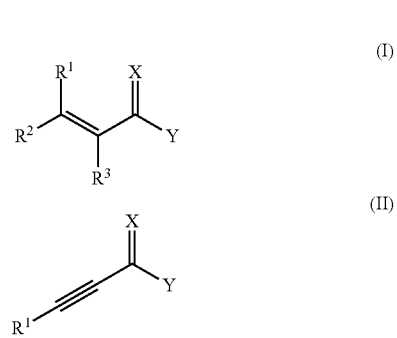

in which $R^1$, $R^2$ and $R^3$, independent of one another, in each instance, represent hydrogen or organic radicals, such as, for example, a linear, branched or cyclic, if applicable a substituted alkyl group, aryl group, aralkyl group (also called aryl-substituted alkyl group) or alkaryl group (also called alkyl-substituted aryl group), including derivatives and substituted versions thereof, wherein these can contain, independent of one another, additional ether groups, carboxyl groups, carbonyl groups, thiol-analogous groups, nitrogen-containing groups or combinations thereof; X represents oxygen, sulfur or $NR^4$, wherein $R^4$ represents hydrogen or any of the organic groups as described above for $R^1$, $R^2$ and $R^3$; Y represents $OR^5$, $SR^5$ or $NR^5R^6$, in which $R^5$ and $R^6$, independent of one another, represent hydrogen or each of the organic groups as described above for $R^1$, $R^2$ and $R^3$.

Preferably, the functional Michael acceptor group is a group having the structure (III):

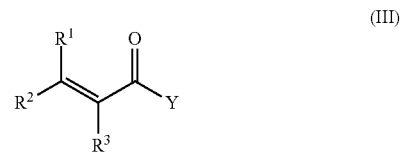

in which $R^1$, $R^2$ and $R^3$ are as described above and Y represents $OR^5$ or $NR^5R^6$, wherein $R^5$ and $R^6$ are as described above.

Each functional Michael acceptor group can be directly bound to another functional Michael acceptor group or a framework by means of one or more of $R^1$, $R^2$, $R^3$, $R^4$, $R^5$ or $R^6$.

Any C,H-acidic compound that has at least two functional Michael donor groups and can form carbanions, particularly enolate anions, which can add to low-electron double bonds in a Michael reaction, can be used as a Michael donor. In this regard, a functional Michael donor group has at least one acidic CH bond, thereby a difunctional Michael donor, which contains two functional Michael donor groups, each of which has an acidic CH bond, has two acidic CH bonds per molecule. A trifunctional Michael donor can contain three functional Michael donor groups, each having only one acidic CH bond, or it can contain two functional Michael donor groups, of which one group contains only one and the second group contains two acidic CH bonds. The carbanion is generally released only after the Michael-active hydrogen atom has been split off, by means of a suitable stoichiometrically or catalytically active base.

It is practical if the Michael-active hydrogen atom is bound to a carbon atom that sits between two electron-withdrawing groups, such as, for example, C=O.

Examples of suitable functional Michael donor groups comprise β-ketoesters, 1,3-diketones, malonic esters and malonic ester derivatives, such as malonamides, and β-ketoamides (in which the Michael-active hydrogen atom is bound to a carbon atom that sits between the carbonyl groups), cyanoacetate esters and cyanoacetamides (in which the Michael-active hydrogen atom is bound to a carbon atom that sits between a carbonyl group and a cyano group), as well as α-nitroalkanes.

Each functional Michael donor group, analogous to the Michael acceptor group, can be directly bound to another functional Michael donor group or a framework.

The multi-functional Michael acceptor and/or the multi-functional Michael donor of the present invention can have any of a broad plurality of frameworks, wherein these can be the same or different.

In some embodiments of the present invention, the framework of the multi-functional Michael donor or of the multi-functional Michael acceptor or of both is a monomer, an oligomer or a polymer.

Preferred frameworks for multi-functional Michael acceptors have a molecular weight (Mw) of 5,000 or less, more preferably of 2,000 or less, and most preferably of 1,000 or less.

Preferred frameworks of the multi-functional Michael donor have a molecular weight (Mw) of 200 or more.

In this regard, the following can be mentioned as examples of polymers: polyalkylene oxide, polyurethane, polyethylene vinyl acetate, polyvinyl alcohol, polydiene, hydrogenated polydiene, alkyd, alkyd polyester, (meth)acrylic polymer, polyolefin, polyester, halogenated polyolefin, halogenated polyester, as well as copolymers or mixtures thereof.

In some exemplary embodiments of the invention, one or more polyol compounds, i.e. one or more multivalent alcohol(s), are used as at least one framework. Some multivalent alcohols that are suitable as a framework either for the multi-functional Michael acceptor or the multi-functional Michael donor comprise, for example, alkane diols, alkylene glycols, such as ethylene glycol, propylene glycol, glycerols, sugar, pentaerythritols, multivalent derivatives thereof or mixtures thereof. Some examples of multivalent alcohols that are suitable as frameworks are neopentyl glycol, trimethylolpropane, ethylene glycol and polyethylene glycol, propylene glycol and polypropylene glycol, butane diol, pentane diol, hexane diol, tricyclodecane dimethylol, 2,2,4-trimethyl-1,3-pentane diol, Bisphenol A, cyclohexanedimethanol, alkoxylated and/or propoxylated derivatives of neopentyl glycol and tetraethylene glycol cyclohexane dimethanol, hexane diol, castor oil, and trimethylolpropane.

In a preferred embodiment, the Structure (III) is bound to a polyol compound by way of $R^4$, by means of an ester bond, wherein the polyol compound is as defined above.

Some suitable multi-functional Michael acceptors in the present invention comprise, for example, molecules in which some or all the Structures (II) are radicals of (meth)acrylic acid, fumaric acid or maleic acid, substituted versions or combinations thereof, which are bound to the multi-functional Michael acceptor molecule by way of an ester bond. A compound having Structures (II), which comprise two or more radicals of (meth)acrylic acid, is referred to herein as a "polyfunctional (meth)acrylate". Polyfunctional (meth)acrylates having at least two double bonds, which can act as the acceptor in the Michael addition, are preferred.

Examples of suitable di(meth)acrylates comprise, but are not restricted to: ethylene glycol di(meth)acrylate, propylene glycol di(meth)acrylate, diethylene glycol di(meth)acrylate, dipropylene glycol di(meth)acrylate, triethylene glycol di(meth)acrylate, tripropylene glycol di(meth)acrylate, tetraethylene glycol di(meth)acrylate, tetrapropylene glycol di(meth)acrylate, polyethylene glycol di(meth)acrylate, polypropylene glycol di(meth)acrylate, mono-ethoxylated or multi-ethoxylated Bisphenol A di(meth)acrylate, Bisphenol A diglycidyl ether di(meth)acrylate, resorcinol diglycidyl ether di(meth)acrylate, 1,3-propane diol di(meth)acrylate, 1,4-butane diol di(meth)acrylate, 1,5-pentane diol di(meth)acrylate, 1,6-hexane diol di(meth)acrylate, neopentyl glycol di(meth)acrylate, cyclohexane dimethanol di(meth)acrylate, mono-ethoxylated or multi-ethoxylated neopentyl glycol di(meth)acrylate, mono-propoxylated or multi-propoxylated neopentyl glycol di(meth)acrylate, mono-ethoxylated or multi-ethoxylated cyclohexane dimethanol di(meth)acrylate, propoxylated cyclohexane dimethanol di(meth)acrylate, arylurethane di(meth)acrylates, aliphatic urethane di(meth)acrylate, polyester di(meth)acrylate, and mixtures thereof.

Examples of suitable tri(meth)acrylates comprise, but are not restricted to: trimethylolpropane tri(meth)acrylate, trifunctional (meth)acrylic acid s triazine, glycerol tri(meth)acrylate, mono-ethoxylated or multi-ethoxylated trimethylolpropane tri(meth)acrylate, mono-propoxylated or multi-propoxylated trimethylolpropane tri(meth)acrylate, tris(2-hydroxyethyl) isocyanurate tri(meth)acrylate, mono-ethoxylated or multi-ethoxylated glycerol tri(meth)acrylate, mono-propoxylated or multi-propoxylated glycerol tri(meth)acrylate, pentaerythritol tri(meth)acrylate, arylurethane tri(meth)acrylates, aliphatic urethane tri(meth)acrylates, melamine tri(meth)acrylates, epoxy-Novolac tri(meth)acrylates, aliphatic epoxy tri(meth)acrylate, polyester tri(meth)acrylate, and mixtures thereof.

Examples of suitable tetra(meth)acrylates comprise, but are not restricted to: di(trimethylolpropane) tetra(meth)acrylate, pentaerythritol tetra(meth)acrylate, mono-ethoxylated or multi-ethoxylated pentaerythritol tetra(meth)acrylate, mono-propoxylated or multi-propoxylated pentaerythritol tetra(meth)acrylate, dipentaerythritol tetra(meth)acrylate, mono-ethoxylated or multi-ethoxylated dipentaerythritol tetra(meth)acrylate, mono-propoxylated or multi-propoxylated dipentaerythritol tetra(meth)acrylate, arylurethane tetra(meth)acrylates, aliphatic urethane tetra(meth)acrylates, melamine tetra(meth)acrylates, epoxy-Novolac tetra(meth)acrylates, polyester tetra(meth)acrylates, and mixtures thereof.

Mixtures of the multi-functional (meth)acrylates with one another can also be used.

Examples of suitable Michael donors comprise: acetoacetates of mono-ethoxylated and mono-propoxylated or multi-ethoxylated and multi-propoxylated diols, triols and polyols, ethylene glycol diacetoacetate, 1,2-propane diol diacetoacetate, 1,3-propane diol diacetoacetate, 1,4-butane diol diacetoacetate, 1,6-hexane diol diacetoacetate, neopentyl glycol diacetoacetate, Bisphenol A diacetoacetate, mono-ethoxylated or multi-ethoxylated Bisphenol A diacetoacetate, isosorbide diacetoacetate, cyclohexane dimethanol diacetoacetate, 1,3-benzene dimethanol diacetoacetate (1,3-BDDA), 1,4-benzene dimethanol diacetoacetate (1,4-BDDA), trimethylolpropane triacetoacetate (Lonzamon AATMP), glycerin triacetoacetate, polycaprolactone triacetoacetate, pentaerythritol tetraacetoacetate, dipentaerythritol hexaacetoacetate, glucose triacetoacetate, glucose tetraacetoacetate, glucose pentaacetoacetate, sucrose acetoacetates, sorbitol triacetoacetate, sorbitol tetraacetoacetate, mono-ethoxylated or multi-ethoxylated neopentyl glycol diacetoacetate, propoxylated glucose acetoacetatates, propoxylated sorbitol acetoacetates, propoxylated sucrose acetoacetates, polyester acetoacetatates, in which the polyester is derived from at least one di-acid and at least one diol, 1,2-ethylene bis-acetoacetamide, polyester amide acetoacetate, in which the polyester amide is derived from at least one di-acid and at least one diamine, acetoacetate-functionalized castor oil, polyester polymer, (meth)acrylate polymer.

The Michael donor can be used alone or as a mixture of two or more different compounds.

Depending on the functionality of the Michael acceptor and/or of the Michael donor, the degree of cross-linking of the binder and thereby both the strength of the resulting coating and its elastic properties can be set. At the same time, this has a direct influence on the achievable expansion of the ash crust that forms in the event of a fire.

In the composition of the present invention, the relative proportion of multi-functional Michael acceptors to multi-functional Michael donors can be characterized by the reactive equivalent ratio, which is the ratio of the number of all functional Michael acceptor groups having the Structures (I), (II) and/or (III) in the composition to the number of Michael-active hydrogen atoms in the composition. In some embodiments, the reactive equivalent ratio is 0.1 to 10:1; preferably 0.2 to 5:1; more preferably 0.3 to 3:1; most preferably 1:2 to 2:1.

By means of the use of a compound that contains an X—H group, preferably one in which X stands for N, P or C as part of an acidic methyl group, as Constituent C, it becomes possible to make available an adjustable reactivity profile, which has an initial induction phase with a reduced reaction rate directly after mixing and activation of the composition, followed by an increase in reactivity after the constituents of the composition have already been mixed for a longer time. This induction time can be adjusted to make available an extended "open time" during which the composition remains sufficiently liquid so that it can be worked. Furthermore, an extended open time makes it possible that any solvents contained in the composition or air bubbles present in the coating can escape. The induction phase allows the system to flow over an extended period of time and to level out. In this way, surface defects can be minimized; these frequently occur during (overly) fast hardening of the composition.

The hardness of the hardened compositions can be influenced by way of setting the period of time over which any solvents present in the composition can evaporate. After the induction phase, the composition behaves like a corresponding composition without Constituent C and hardens accordingly.

The constituents of the composition form an acid/base equilibrium system. The reactivity profile of the composition results from the selection of the corresponding pKa values of the acidic Constituents B and C in the composition, which contribute to the acid/base equilibrium, and from the reactivity of the deprotonated form of the constituents as compared with Constituent A.

In the following, pKa values of selected Constituents B or C are listed:

| | |
|---|---|
| Benzotriazole | 8.2 |
| Acetyl acetone | 9.0 |
| Ethosuximide | 9.3 |
| 1,2,3-Triazole | 9.4 |
| Succinimide | 9.5 |
| 4-Nitro-2-methylimidazole | 9.6 |
| Uracil | 9.9 |
| Phenol | 10.0 |
| Benzene sulfonamide | 10.1 |
| 5,5-Dimethylhydantoin | 10.2 |
| 1,2,4-Triazole | 10.2 |
| Nitromethane | 10.2 |
| Isatin | 10.3 |
| Ethyl acetoacetate | 10.7 |
| Diethyl malonate | 13.0 |

The X—H group of Constituent C has a greater acidity than the acidic C—H group of Constituent B. Preferably, Constituent C has a pKa (determined in an aqueous medium) that lies at least one whole-number unit, preferably two whole-number units below the pKa of Constituent B. In particular, the pKa of Constituent C is less than 13, preferably less than 12, more preferably less than 11, and even more preferably less than 10. At a higher acidity, problems with the catalyst occur. For this reason, the pKa of Constituent C is preferably greater than 7, more preferably greater than 8. The differences in the pKa values of Constituents B and C ensure that when using the composition, Constituent C is preferentially activated, i.e. deprotonated before Constituent B.

In a composition that contains Constituents A, B, and C, Constituent C has greater reactivity in a Michael addition as compared with Constituent A than Constituent B, so that Constituent C reacts faster with Constituent A than Constituent B does. The greater reactivity of Constituent C leads to the induction time.

In the Michael addition, Constituent C has a reactivity, as compared with the acidic C—H groups of Constituent B, which is higher by a factor of at least 3, preferably at least 10, more preferably at least 30, determined under comparable conditions, wherein the constituents are reacted at room temperature, with an excess of Michael acceptors, in the presence of a base that can deprotonate at least 1 mole-% of the Michael donor. This is helpful for making the induction time available. If other temperatures of use are required, the relative reactivity should be determined at the adapted temperatures, in order to select suitable compounds.

In the composition according to the invention, the X—H groups are preferably present at a proportion of at least 50 mole-%, preferably at least 100 mole-%, more preferably at least 150 mole-%, with reference to the amount of base that is released by Constituent D. Furthermore, the X—H groups in Constituent C are present in an amount of not more than 30 mole-%, preferably not more than 20 mole-%, with reference to the acidic C—H groups of Constituent B.

The suitable amount is primarily determined by means of the acid/base character of Constituent C as compared with Constituent B and the reactivity of the corresponding anion as compared with Constituent A. It can therefore vary for different systems. The open time can therefore already be set at very small amounts of Constituent C. This is advantageous because the very small amounts of Constituent C have hardly any influence on the properties of the resulting, hardened composition, such as the chemical and mechanical properties of a coating. Usually, the X—H groups in Constituent C are present at a proportion that corresponds to not more than 30 mole-%, preferably not more than 20 mole-%, with reference to the C—H groups of Constituent B.

Suitable compounds as Constituent C are compounds in which X stands for a carbon atom (C) and the carbon atom is part of an acidic methyl group, wherein nitromethane is preferred. In other suitable compounds having an X—H group, X stands for an oxygen atom (O), wherein an aromatic hydroxyl group is preferred.

Preferred compounds are acidic aza compounds, in which X stands for a nitrogen atom (N), wherein the N—H group is preferably part of an Ar—NH—(C=O)—, —(C=O)—NH—(C=O)— or —NH—(O=S=O) group or a heterocycle, in that the nitrogen atom of the N—H group is an integral part of the ring system. More preferably, the compound is an imide derivative, preferably a cyclic imide derivative, particularly preferably succinimide, substituted if applicable, or glutarimide. As an example, ethosuximide can be mentioned as a substituted succinimide.

Other suitable compounds in which X stands for a nitrogen atom are hydantoin derivatives, such as 5,5-dimethyl hydrantoin, sulfonamides such as aromatic sulfonamides, for example benzene sulfonamide or toluene sulfonamide, or heterocyclic compounds having an N—H group, preferably a triazole, pyrazole or imidazole, possibly substituted, particularly 1,2,4-triazoles, benzotriazole or 2-methyl-4-nitroimidazole or a uracil derivative.

Constituent C can be present in deprotonated form (in an acid/base equilibrium with other constituents).

The amount information provided herein relates both to the neutral form and to the deprotonated form. This means that if Constituent C is present in an amount of more than 100% with reference to a basic catalyst, Constituent C and the catalyst can be present in equilibrium, so that the deprotonated form of Constituent C is present as the dominant species, which initiates hardening of the composition, instead of Constituent D being present as the basic species and Constituent C as the acidic species. Preferably, the X—H functionality, i.e. the number of X—H groups per molecule of Constituent C, is low, preferably lower than 4, more preferably lower than 2, most preferably it is 1.

Constituent C can contain one or more different compounds having at least one X—H group.

Aside from Constituent C, the composition can comprise a further Constituent B2, which contains acidic protons (C—H) in activated methylene or methine groups, has greater acidity than Constituent B, and can react with Constituent A. Constituent B2 can contribute to the effect of influencing the open time. For this purpose, it is practical if Constituent B2 is contained at a proportion between 10 and 40 wt.-%, which is clearly more than for Constituent C. In the composition, the C—H groups are contained in Constituent B2 at a proportion between 1 and 50 mole-%, preferably between 5 and 40 mole-%, with reference to the total proportion of C—H groups in Constituent B.

Constituent B2 preferably has a structure Z—C(=O)—CHR—C(=O)—Z', in which R stands for hydrogen or an alkyl, aralkyl or aryl group, and Z and Z' can be the same or different, and stand for different substituent groups, particularly alkyl, aralkyl or aryl groups (R*), alkoxy groups (—OR*) or a polymer basic framework, or in which the —C(=O)—Z and/or —C(=O)—Z' unit is replaced with CN or phenyl.

Constituent C and, if present in the composition, Constituent B2 must be taken into consideration in the reactive equivalent ratio mentioned above, which is the ratio of the number of all the functional Michael acceptor groups in the composition to the number of Michael-active hydrogen atoms in the composition.

The difference in acidity of the two C—H-acid Constituents B and B2 is selected in such a manner that the pKa of Constituent B2 is less by between 0.5 and 6, preferably between 1 and 5, and more preferably between 1.5 and 4 units than the pKa of Constituent B.

The reaction between the Michael acceptor and the Michael donor takes place in the presence of a catalyst (Constituent D). The bases usually used for Michael-addition reactions, if applicable in combination with a suitable phase transfer catalyst, nucleophile or phosphine, which are known to a person skilled in the art, can be used as catalysts. Furthermore, quaternary ammonium carbonates and bicarbonates, phosphonium carbonates and bicarbonates can be used as catalysts.

Suitable bases are: tertiary amines such as triethylamine, ethyl-N,N-diisopropylamine, 1,4-diazabicyclo[2.2.2]octane (DABCO); "blocked" bases such as formiate salts of amine or amidine bases; amidine bases such as 1,8-diazabicyclo[5.4.0]undec-7-ene (DBU) and 1,5-diazabicyclo[4.3.0]non-5-ene (DBN); guanidine bases such as tetramethylguanidine (TMG) and 1,5,7-triazabicyclo[4.4.0]dec-5-ene (TBD); inorganic bases such as potassium carbonate, potassium bicarbonate, phosphates and hydrogen phosphates; quaternary ammonium hydroxides such as benzyltrimethylammonium hydroxide and tetrabutylammonium hydroxide (TBAH); proton sponge, such as 1,8-bis(dimethylamino)naphthalene; pyridine bases such as 2,6-di-tert-butylpyridine, 2,6-lutidine, and dimethylaminopyridine (DMAP); carboxylic acid salts such as sodium or potassium salts of carboxylic acids, e.g. acetates; alcoholates such as sodium methanolate, potassium methanolate, sodium ethanolate, potassium ethanolate, and potassium-tert-butyl alcoholate.

Suitable phase transfer catalysts are: quaternary ammonium or phosphonium compounds such as methyltrioctylammonium chloride, benzyltrimethylammonium chloride, hexadecyltributylphosphonium bromide, tetra-n-butylammonium chloride, and tetra-n-butylammonium bromide. The catalysis of Michael-addition reactions by means of phase transfer catalysts is described, for example, in E. Diez-Barra, A. de la Hoz, S. Merino, A. Rodriguez, P. Sánchez-Verdú, *Tetrahedron* 1998, 54, 1835.

Suitable nucleophiles are: primary or secondary alkylamines such as n-pentylamine and di-n-propylamine.

Suitable phosphines are: tertiary phosphines such as tri-n-propylphosphine, tri-n-butylphosphine, tri-n-octylphosphine, dimethylphenylphosphine, methyldiphenylphosphine or triphenylphosphine, as described, for example, in J. W. Chan, C. E. Hoyle, A. B. Lowe, M. Bowman, *Macromolecules* 2010, 43, 6381-6388. In this regard, reference is furthermore made to WO 2010/030771 A1, the content of which is hereby incorporated into this application.

Suitable quaternary ammonium carbonates or phosphonium carbonates are: tetramethylammonium methyl carbonate, tetramethylammonium ethyl carbonate, tetrabutylammonium methyl carbonate, tetrabutylammonium ethyl carbonate, tetrahexylammonium methyl carbonate, tetrahexylammonium ethyl carbonate, tetraoctylammonium methyl carbonate, tetraoctylammonium ethyl carbonate, tetradecylammonium methyl carbonate, tetradecylammonium ethyl carbonate, hexadecyltrimethylammonium methyl carbonate, hexadecyltrimethylammonium ethyl carbonate, benzyltrimethylammonium methyl carbonate, benzyltrimethylammonium ethyl carbonate, tetrabutylammonium bicarbonate, tetrahexylammonium bicarbonate, benzyltrimethylammonium bicarbonate, tetrabutylphosphonium methyl carbonate. Such catalysts are described, for example, in M. Fabris, V. Lucchini, M. Noè, A. Perosa, M. Selva, *Chem. Eur. J.* 2009, 15, 12273 and M. Fabris, M. Noé, A. Perosa, M. Selva, R. Ballini, *J. Org. Chem.* 2012, 77, 1805. In this regard, reference is furthermore made to WO 11/124663 A as well as WO 11/055463 A, the contents of which are hereby incorporated into this application.

The catalyst can be used in catalytic amounts or in equimolar manner or in excess.

Although the reaction of the Michael acceptor and of the Michael donor can take place in the absence of a solvent, it is sometimes necessary to change and/or to adapt the effectiveness of the reaction or the viscosity of the constituents, particularly of the Michael acceptor.

Preferably, a solvent is used that has a low viscosity and participates in the reaction, and is built into the binder, called a reactive diluent. Suitable reactive diluents are themselves Michael acceptors having at least one functional Michael acceptor group, which are, however, monomeric or oligomeric, preferably monomeric, and can have the corresponding frameworks mentioned above.

The method of action of the composition according to the invention, which has an ablative effect, is based on an endothermic physical and/or chemical reaction, wherein substances which require large amounts of energy in their decomposition are contained in the composition. If the hardened composition is exposed to an elevated temperature, such as, for example, in the event of a fire, to the temperature of the fire, a number of chemical and physical processes are put into motion. These processes are, for example, release of steam, a change in the chemical composition, and the formation of non-combustible gases, which keep the oxygen required for combustion away from the cable surface. All of these processes require a large amount of energy, which is withdrawn from the fire. After the conversion of all the organic constituents has been concluded, a stable insulation layer composed of inorganic constituents has formed, which has an additional insulating effect.

According to the invention, Constituent E therefore contains at least one fire-protection additive that has an ablative effect, wherein both individual compounds and a mixture of multiple compounds can be used as additives.

It is practical if materials that form energy-consuming layers by means of splitting off water, which is embedded in the form of water of crystallization, for example, and water evaporation, are used as fire-protection additives having an ablative effect. In this regard, the heat energy that must be expended to split off the water is withdrawn from the fire. Furthermore, materials that change chemically, i.e. decompose, evaporate, sublimate or melt in an endothermic reaction under the effect of heat, are used. As a result, the coated substrates are cooled. Frequently, inert, i.e. non-combustible gases such as carbon dioxide, for example, are released during decomposition, and these additionally dilute the oxygen in the immediate vicinity of the coated substrate.

Hydroxides such as aluminum hydroxide and magnesium hydroxide, as well as their hydrates, which split off water, as well as carbonates such as calcium carbonate, which split off carbon dioxide, are suitable as constituents that split off gas. Basic carbonates can split off both water and $CO_2$. A combination of constituents that begin splitting off gas at different temperatures is preferred. Thus, in the case of aluminum hydroxide, splitting off water already begins at approximately 200°, while in the case of magnesium hydroxide, splitting off water starts at approximately 350°, so that splitting off gas takes place over a greater temperature range.

Suitable materials having an ablative effect are inorganic hydroxides or hydrates that give off water under the effect of heat, such as those of sodium, potassium, lithium, barium, calcium, magnesium, boron, aluminum, zinc, nickel, furthermore, boric acid and its partially dehydrated derivatives.

The following compounds can be mentioned as examples: $LiNO_3.3H_2O$, $Na_2CO_3H_2O$ (thermonatrite), $Na_2CO_3.7H_2O$, $Na_2CO_3.10H_2O$ (soda), $Na_2Ca(CO_3)_2.2H_2O$ (pirssonite), $Na_2Ca(CO_3)_2.5H_2O$ (gaylussite), $Na(HCO_3)Na_2CO_3.2H_2O$ (trona), $Na_2S_2O_3.5H_2O$, $Na_2O_3Si.5H_2O$, $KF.2H_2O$, $CaBr_2.2H_2O$, $CaBr_2.6H_2O$, $CaSO_4.2H_2O$ (gypsum), $Ca(SO_4).½H_2O$ (bassanite), $Ba(OH)_2.8H_2O$, $Ni(NO_3)_2.6H_2O$, $Ni(NO_3)_2.4H_2O$, $Ni(NO_3)_2.2H_2O$, $Zn(NO_3)_2.4H_2O$, $Zn(NO_3)_2.6H_2O$, $(ZnO)_2(B_2O_3)_2.3H_2O$, $Mg(NO_3)_2.6H_2O$ (U.S. Pat. No. 5,985,013 A), $MgSO_4.7H_2O$ (EP1069172A), $Mg(OH)_2$, $Al(OH)_3$, $Al(OH)_3.3H_2O$, $AlOOH$ (boehmite), $Al_2[SO_4]_3.nH_2O$ with n=14-18 (U.S. Pat. No. 4,462,831 B), if applicable in a mixture with $AlNH_4(SO_4)_2.12H_2O$ (U.S. Pat. No. 5,104,917A), $KAl(SO_4)_2.12H_2O$ (EP1069172A), $CaO.Al_2O_3.10H_2O$ (nesquehonite), $MgCO_3.3H_2O$ (wermlandite), $Ca_2Mg_{14}(Al,Fe)_4CO_3(OH)_{42}.29H_2O$ (thaumasite), $Ca_3Si(OH)_6(SO_4)(CO_3).12H_2O$ (artinite), $Mg_2(OH)_2CO_3.H_2O$ (ettringite), $3CaO.Al_2O_3.3CaSO_4.32H_2O$ (hydromagnesite), $Mg_5(OH)_2(CO_3)_4.4H_2O$ (hydrocalumite), $Ca_4Al_2(OH)_{14}.6H_2O$ (hydrotalcite), $Mg_6Al_2(OH)_{16}CO_3.4H_2O$ alumohydrocalcite, $CaAl_2(OH)_4(CO_3)_2.3H_2O$ scarbroite, $Al_{14}(CO_3)_3(OH)_{36}$ hydrogarnet, $3CaO.Al_2O_3.6H_2O$ dawsonite, $NaAl(OH)CO_3$, hydrated zeolites, vermiculites, colemanite, perlites, mica, alkali silicates, borax, modified carbons and graphites, silicic acids.

In a preferred embodiment, the hydrated salts are selected from the group consisting of $Al_2(SO_4)$ 16-18$H_2O$, $NH_4Fe(SO_4)_2.12H_2O$, $Na_2B_4O_7.10H_2O$, $NaAl(SO_4)_2.12H_2O$, $AlNH_4(SO_4)_2.12$-24$H_2O$, $Na_2SO_4.10H_2O$, $MgSO_4.7H_2O$, $(NH_4)_2SO_4.12H_2O$; $KAl(SO_4)_2.12H_2O$, $Na_2SiO_3.9H_2O$, $Mg(NO_2)_2.6H_2O$, $Na_2CO_3.7H_2O$ and mixtures thereof (EP1069172A).

Aluminum hydroxide, aluminum hydroxide hydrates, magnesium hydroxide, and zinc borate are particularly preferred, since they have an activation temperature below 180° C.

Optionally, one or more reactive flame retardants can be added to the composition according to the invention. Such compounds are built into the binder. An example in the sense of the invention are reactive organophosphorus compounds, such as 9,10-dihydro-9-oxa-10-phosphaphene anthrene-10-oxide (DOPO) and its derivatives and adducts. Such compounds are described, for example, in S. V. Levchik, E. D. Weil, Polym. Int. 2004, 53, 1901-1929 or E. D. Weil, S. V. Levchik (eds.), Flame Retardants for Plastics and Textiles—Practical Applications, Hanser, 2009, the contents of which are hereby incorporated into this application.

The fire-protection additive having an ablative effect can be contained in the composition in an amount of 5 to 99 wt.-%, wherein the amount depends essentially on the application form of the composition (spraying, brushing, and the like). In order to achieve the best possible insulation, the proportion of Constituent E in the total formulation is set to be as high as possible. Preferably, the proportion of Constituent E in the total formulation amounts to 5 to 85 wt.-% and, particularly preferably, to 40 to 80 wt.-%.

Aside from the fire-protection additives that have an ablative effect, the composition can contain usual aids, if necessary, such as wetting agents, for example on the basis of polyacrylates and/or polyphosphates, anti-foaming agents such as silicone anti-foaming agents, thickeners such as alginate thickeners, pigments, fungicides, softening agents such as waxes containing chlorine, binders, flame retardants or various fillers such as vermiculite, inorganic fibers, quartz sand, micro-glass beads, mica, silicon dioxide, mineral wool, and the like.

Additional additives such as thickeners, rheology additives, and fillers can be added to the composition. Preferably, polyhydroxycarboxylic acid amides, urea derivatives, salts of unsaturated carboxylic acid esters, alkylammonium salts of acidic phosphoric acid derivatives, ketoximes, amine salts of p-toluene sulfonic acid, amine salts of sulfonic acid derivatives, as well as aqueous or organic solutions or mixtures of the compounds are used are used as rheology additives, such as anti-settling agents, anti-sag agents, and thixotroping agents. In addition, rheology additives on the basis of pyrogenic or precipitated silicic acid or on the basis of silanized pyrogenic or precipitated silicic acids can be used. Preferably, the rheology additive involves pyrogenic silicic acids, modified and non-modified phyllosilicates, precipitation silicic acids, cellulose ethers, polysaccharides, PU and acrylate thickeners, urea derivatives, castor oil derivatives, polyamides and fatty acid amides and polyolefins, if they are present in solid form, powdered celluloses and/or suspension agents such as xanthan gum, for example.

The composition according to the invention can be packaged as a two-component or multi-component system.

If Constituent A and Constituent B do not react with one another without the use of a catalyst at room temperature, they can be stored together. If a reaction occurs at room temperature, Constituent A and Constituent B must be disposed separately, so as to inhibit a reaction. In the presence of a catalyst, the latter must be stored separately from Constituent B. If, based on the nature of the catalyst, the latter reacts with Constituent A, it must be stored separately from the two constituents. A person skilled in the art recognizes or can easily determine which catalyst is suitable for resulting in a component that can be stored together with Constituent A. In general, it is important that Constituents A and B of the binder and the catalyst are mixed with one another only immediately before use, and then trigger the hardening reaction.

Constituent C can be stored together with Constituents A and B or Constituent D. If Constituents A, B, and C are stored with one another, it is preferred if the X—H group of Constituent C is not too reactive as compared with Constituent A in the absence of the catalyst, so that storage stability is increased. Accordingly, it is preferred that Constituent C has such reactivity, in a Michael addition with Constituent A without catalyst, that its half-life at room temperature amounts to more than 30 minutes, preferably more than one hour, more preferably more than two hours, even more preferably more than four hours, even more preferably more than 24 hours, and most preferably more than 72 hours, measured in butyl acrylate.

In this connection, Constituent E can be contained as a total mixture or divided up into individual components, in one component or multiple components. The division of Constituent E takes place as a function of the compatibility of the compounds contained in the composition, so that neither a reaction of the compounds contained in the composition with one another nor reciprocal disruption can take place. This is dependent on the compounds used. In this way, it is ensured that the greatest possible proportion of fillers can be achieved. This leads to high intumescence, even at low layer thicknesses of the composition.

The composition is applied as a paste, using a brush, a roller or by spraying it onto the substrate, which can be metallic, plastic in the case of cables, or both in the case of cable runs or soft fittings composed of mineral wool. Preferably, the composition is applied by means of an airless spraying method.

The composition according to the invention is characterized, as compared with the solvent-based and water-based systems, by relatively fast hardening by means of an addition reaction, and thereby physical drying is not necessary. This is particularly important if the coated components must quickly be subjected to stress or processed further, whether by being coated with a cover layer or by moving or transporting the components. Also, the coating is therefore clearly less susceptible to external influences on the construction site, such as, for example, an impact of (rain) water or dust and dirt, which can lead to water-soluble constituents such as the ammonium polyphosphate being washed out, in solvent-based or water-based systems, or can lead to reduced intumescence if dust is picked up. Because of the low viscosity of the composition, in spite of the high proportion of solids, which can amount to as much as 99 wt.-% in the composition, without the addition of volatile solvents, the composition remains easy to process, particularly by means of common spray methods.

For this reason, the composition according to the invention is particularly suitable as a fire-protection coating, particularly a sprayable coating for components on a metallic and non-metallic basis. The composition according to the invention is used, above all, in the construction sector, as a coating, particularly a fire-protection coating for individual cables, cable bundles, cable runs and cable ducts or other lines, as well as a fire-protection coating for steel construction elements, but also for construction elements composed of other materials, such as concrete or wood.

A further object of the invention is therefore the use of the composition according to the invention as a coating, particularly as a coating for construction elements or components composed of steel, concrete, wood, and other materials, such as plastics, for example, particularly as a fire-protection coating for individual cables, cable bundles, cable runs, and cable ducts or other lines or soft fittings.

The present invention also relates to objects that are obtained when the composition according to the invention has hardened. The objects have excellent ablative properties.

The following examples serve to further explain the invention.

EXEMPLARY EMBODIMENTS

The constituents listed below are used for the production of compositions according to the invention, having an ablative effect. In each instance, the individual components are mixed and homogenized using a dissolver. For use, these mixtures are then mixed either before being sprayed or during spraying, and applied.

To determine the fire-protection properties, the hardened composition was subjected to a test according to EN ISO 11925-2. The test takes place in a burn box set up to be draft-free, a Mitsubishi FR-D700SC Electric Inverter. During the test, a small burner flame is directed at the sample surface at an angle of 45° for 30 s; this corresponds to surface flame exposure.

In each instance, samples having the dimensions 11 cm×29.5 cm and a use thickness of 1 mm are used. These samples hardened at room temperature and were aged at 40° C. for three days.

After aging for three days at 40° C., the test for flammability and the height of the attacked surface takes place.

The hardening time and the hardening progression were determined. In this connection, testing was done with a spatula to determine when hardening of the coating starts.

For the following Examples 1 to 3, aluminum trihydrate (HN 434 from J.M. Huber Corporation, Finland) was used as a fire-protection additive having an ablative effect (Constituent E) and used in an amount of 18.0 g:

Example 1

| Constituent | Amount [g] |
| --- | --- |
| Trimethylolpropane triacrylate | 25.9 |
| Trimethyl phosphine | 0.3 |
| Trimethylolpropane triacetoacetate | 33.8 |
| Calcium carbonate[1] | 71.1 |

Example 2

| Constituent | Amount [g] |
| --- | --- |
| Glycerin propoxylate triacrylate | 29.7 |
| Trimethylolpropane triacetoacetate | 26.8 |
| Potassium carbonate | 3.6 |
| Calcium carbonate | 72.0 |

Example 3

| Constituent | Amount [g] |
| --- | --- |
| Trimethylolpropane triacrylate | 12.3 |
| Ethylene glycol methacrylate | 12.3 |
| Trimethylolpropane triacetoacetate | 32.0 |
| Potassium carbonate | 3.4 |
| Calcium carbonate | 72.5 |

Comparative Example 1

A commercial fire-protection product (Hilti CFP SP-WB) based on an aqueous dispersion technology served as a comparison.

TABLE 1

Results of the determination of hardening time, igniting, and flame height

| | Comparative Example 1 | Example 1 | Example 2 | Example 3 |
| --- | --- | --- | --- | --- |
| Hardening time | 24 h | <1 h | <1 h | <1 h |
| Igniting | yes | no | no | no |
| Flame height | 150 mm | 86 mm | 65 mm | 62 mm |

The invention claimed is:

1. A composition having an ablative effect, comprising:
A) a constituent A, which contains a multi-functional Michael acceptor, which has at least two electron-deficient multiple carbon bonds per molecule as functional Michael acceptor groups;
B) a constituent B, which contains a multi-functional Michael donor, which has at least two —C—H-acidic groups per molecule as functional Michael donor groups;
C) a constituent C, which contains a compound that has an X—H group, wherein this compound can react with constituent A and wherein X stands for N, P, O, S or C, with the proviso that if X stands for C, C is part of an acidic methyl group;
D) a constituent D, which contains a catalyst for a Michael addition reaction; and
E) a constituent E, which contains at least one fire-protection additive having an ablative effect.

2. The composition according to claim 1, wherein the functional Michael acceptor groups have structure (I) or (II):

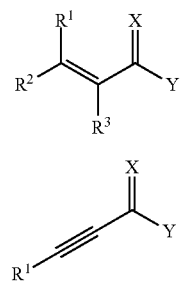

wherein
$R^1$, $R^2$ and $R^3$, independently of one another, in each instance, represent a linear, branched or cyclic, optionally substituted alkyl group, aryl group, aralkyl group or alkyl aryl group,
wherein $R^1$, $R^2$ and $R^3$, independently of one another, can further contain an ether group, a carboxyl group, a carbonyl group, a thiol-analog group, a group containing nitrogen or a combination thereof;
X represents O, S or $NR^4$, in which $R^4$ represents hydrogen or each of the organic groups, as they are described for $R^1$, $R^2$ and $R^3$; and
Y represents $OR^5$, $SR^5$ or $NR^5R^6$, in which $R^5$ and $R^6$ represent hydrogen or each of the organic groups as described above for $R^1$, $R^2$ and $R^3$.

3. The composition according to claim 2, wherein each functional Michael acceptor group is directly attached to another functional Michael acceptor group, which can be the same or different, or to a framework, by way of one or more of $R^1$, $R^2$, $R^3$, $R^4$, $R^5$ or $R^6$.

4. The composition according to claim 3, wherein the functional Michael acceptor groups are bound to a polyol compound, an oligomer or polymer by way of $R^4$, $R^5$ or $R^6$.

5. The composition according to claim 1, wherein the functional Michael donor groups are selected from the group consisting of β-ketoesters, β-ketoamides, 1,3-diketones, malonic esters, malonic ester derivatives, cyanoacetate esters, cyanoacetamides, α-nitroalkanes and combinations thereof.

6. The composition according to claim 4, wherein the functional Michael acceptor groups or the functional Michael donor groups, independently of one another, in each instance, are bound to a polyol compound, which is selected from the group consisting of pentaerythritol, neopentyl glycol, glycerol, trimethylolpropane, ethylene glycol, and polyethylene glycols, propylene glycols and polypropylene glycols, butane diol, pentane diol, hexane diol, tricyclodecane dimethylol, 2,2,4-trimethyl-1,3-pentane diol, bisphenol A, cyclohexane dimethanol, alkoxylated and/or propoxylated derivatives of neopentyl glycol and tetraethylene glycol and mixtures thereof.

7. The composition according to claim 1, % herein the X—H group of constituent C is characterized by a pKa (determined in an aqueous medium) that is less, by at least one w % hole-number unit, than a pKa of predominant C—H groups in constituent B.

8. The composition according to claim 1, wherein the X—H groups in constituent C are contained at a proportion of at least 50 mole-%, with reference to an amount of base that is released by constituent D.

9. The composition according to claim 1, wherein the X—H groups in constituent C are contained at a proportion of not more than 30 mole-%, with reference to the C—H acidic groups of constituent B.

10. The composition according to claim 1, comprising in addition to constituent C, a further constituent B2 which comprises a compound having acidic protons (C—H) in an activated methylene or methine group, wherein the compound has higher acidity compared with constituent B, and can react with constituent A.

11. The composition according to claim 10, wherein the C—H groups are contained in constituent B2 in a proportion between 1 and 50 mole-%, with reference to the total C—H groups in constituent B.

12. The composition according to claim 1, wherein a reactive equivalent ratio lies in the range of 0.1:1 to 10:1.

13. The composition according to claim 1, wherein the at least one fire-protection additive having an ablative effect is selected from the group consisting of $LiNO_3 \cdot 3H_2O$, $Na_2CO_3H_2O$ (thermonatrite), $Na_2CO_3 \cdot 7H_2O$, $Na_2CO_3 \cdot 10H_2O$ (soda), $Na_2Ca(CO_3)_2 \cdot 2H_2O$ (pirssonite), $Na_2Ca(CO_3)_2 \cdot 5H_2O$ (gaylussite), $Na(HCO_3)Na_2CO_3 \cdot 2H_2O$ (trona), $Na_2S_2O_3 \cdot 5H_2O$, $Na_2O_3Si \cdot 5H_2O$, $KF \cdot 2H_2O$, $CaBr_2 \cdot 2H_2O$, $CaBr_2 \cdot 6H_2O$, $CaSO_4 \cdot 2H_2O$ (gypsum), $Ca(SO_4) \cdot \frac{1}{2}H_2O$ (bassanite), $Ba(OH)_2 \cdot 8H_2O$, $Ni(NO_3)_2 \cdot 6H_2O$, $Ni(NO_3)_2 \cdot 4H_2O$, $Ni(NO_3)_2 \cdot 2H_2O$, $Zn(NO_3)_2 \cdot 4H_2O$, $Zn(NO)_2 \cdot 6H_2O$, $(ZnO)_2(B_2O_3)_2 \cdot 3H_2O$, $Mg(NO_3)_2 \cdot 6H_2O$ $MgSO_4 \cdot 7H_2O$, $Mg(OH)_2$, $Al(OH)_3$, $Al(OH)_3 \cdot 3H_2O$, $AlOOH$ (boehmite), $Al_2[SO_4]3 \cdot nH_2O$ with n=14-18, optionally in a mixture with a $AlNH_4(SO_4)_2 \cdot 12H_2O$, $KAl(SO_4)_2 \cdot 12H_2O$, $CaO \cdot Al_2O_3 \cdot 10H_2O$ (nesquehonite), $MgCO_3 \cdot H_2O$ (wermlandite), $Ca_2Mg_{14}(Al,Fe)_4CO_3(OH)_{42} \cdot 29H_2O$ (thaumasite), $Ca_3Si(OH)_6(SO_4)(CO_3) \cdot 12H_2O$ (artinite), $Mg_2(OH)_2CO_3 \cdot H_2O$ (ettringite), $3CaO \cdot Al_2O_3 \cdot 3CaSO_4 \cdot 32H_2O$ (hydromagnesite), $Mg_5(OH)_2(CO_3)_4 \cdot 4H_2O$ (hydrocalumite), $Ca_4Al_2(OH)_{14} \cdot 6H_2O$ (hydrotalcite), $Mg_6Al_2(OH)_{16}CO_3 \cdot 4H_2O$ alumohydrocalcite, $CaAl_2(OH)_4(CO_3)_2 \cdot 3H_2O$ scarbroite, $Al_{14}(CO_3)_3(OH)_{36}$ hydrogarnet, $3CaO \cdot Al_2O_3 \cdot 6H_2O$ dawsonite, $NaAl(OH)CO_3$, aqueous zeolite, vermiculite, colemanite, perlites, mica, alkali silicates, borax, modified carbons, graphites, silicic acids, and mixtures thereof.

14. The composition according to claim 1, further comprising an organic and/or inorganic admixture and/or another additive.

15. The composition according to claim 1, which is packaged as a two-component or multi-component system.

16. The composition according to claim 15, wherein said fire-protection additive having an ablative effect is a mixture of two or more single compounds present in one component of said two- or multi-component system.

17. The composition according to claim 15, wherein said fire-protection additive having an ablative effect is a mixture of two or more single compounds distributed over two or more components of the two- or multi-component system.

18. A coating, comprising:
the result of applying the composition according to claim 1 to a substrate and hardening.

19. The coating according to claim 18 which comprises a fire-protection layer.

20. A construction element, comprising:
the result of applying the composition according to claim 1 to a substrate and hardening.

21. A non-metallic component, comprising:
the result of applying the composition according to claim 1 to a substrate and hardening.

22. A hardened object obtained by hardening the composition according to claim 1.

23. A method of producing a coating, comprising:
coating a surface with the composition according to claim 1.

* * * * *